US008634095B2

(12) United States Patent
Watanabe et al.

(10) Patent No.: US 8,634,095 B2
(45) Date of Patent: *Jan. 21, 2014

(54) APPARATUS, SYSTEM, METHOD, AND MEDIUM FOR DATA ADMINISTERING WHICH ENABLE POWER SAVING BASED ON POWER-OFF INFORMATION

(75) Inventors: Kanehiro Watanabe, Sagamihara (JP); Shinichi Kawabata, Hino (JP)

(73) Assignee: Konica Minolta Business Technologies, Inc. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/327,866

(22) Filed: Dec. 16, 2011

(65) Prior Publication Data

US 2012/0162709 A1    Jun. 28, 2012

(30) Foreign Application Priority Data

Dec. 28, 2010   (JP) .................................. 2010-294159

(51) Int. Cl.
*G06F 3/12*    (2006.01)

(52) U.S. Cl.
USPC .......................................... 358/1.15; 358/1.1

(58) Field of Classification Search
USPC .................................................. 358/1.14, 1.1
See application file for complete search history.

(56) References Cited

U.S. PATENT DOCUMENTS

2003/0191975 A1* 10/2003 Kohara ......................... 713/300
2009/0300214 A1* 12/2009 Ogata ........................... 709/238

FOREIGN PATENT DOCUMENTS

JP    2002-182885 A    6/2002
JP    2010-64253 A    3/2010

* cited by examiner

*Primary Examiner* — Qian Yang
*Assistant Examiner* — Martin Mushambo
(74) *Attorney, Agent, or Firm* — Cantor Colburn LLP

(57) ABSTRACT

A data administering apparatus configured to be connected to a plurality of information processing apparatuses and to administer information which is transmitted from the plurality of information processing apparatuses and relates to an image forming apparatus, includes: a communicating section to receive power-off information which is transmitted from the plurality of information processing apparatuses and is used to turn off a power source of the image forming apparatus, and a control section to administer a number of times of power-off of the image forming apparatus based on the power-off information received by the communicating section.

15 Claims, 14 Drawing Sheets

| USER | TIME | | |
|---|---|---|---|
| | 9:00 - 10:00 | 10:00 - 11:00 | ... |
| USER A | *9:02<br>9:06<br>9:20<br>*9:32<br>*9:48<br>*9:57 | **-:-- | ... |
| USER B | *9:09<br>*9:23<br>9:40<br>*9:51 | *10:09<br>*10:15<br>10:28<br>*10:46 | ... |
| USER C | | *10:16<br>10:32 | ... |
| USER D | *-:--<br>*-:--<br>*-:-- | | ... |

\* : WITH JOB TRANSMISSION
\*\* : AFTER JOB TRANSMISSION, WITH JOB
-:-- : AFTER JOB TRANSMISSION, NO POWER-OFF OPERATION

| SITUATION | | | ENERGY-SAVING CONTRIBUTION | PRIMARY POINT |
|---|---|---|---|---|
| CONDITION | JOB | POWER SOURCE OF AN IMAGE FORMING APPARATUS | | |
| THE CASE WHERE THE POWER SOURCE OF AN IMAGE FORMING APPARATUS IS TURNED OFF | TRANSMISSION / NON TRANSMISSION | OFF | NO. 1 | +1 |
| THE CASE WHERE THE POWER SOURCE OF AN IMAGE FORMING APPARATUS CANNOT BE TURNED OFF | TRANSMISSION | ON | NO. 2 | 0 |
| THE CASE WHERE THE POWER SOURCE OF AN IMAGE FORMING APPARATUS IS NOT TURNED OFF | TRANSMISSION | ON | NO. 3 | -1 |

| TOTAL PRIMARY POINT | SECONDARY POINT |
|---|---|
| NO. 1 (+5) | +4 |
| NO. 2 (+4) | +3 |
| NO. 3 (0) | +2 |
| NO. 4 (-3) | +1 |

| | 9:00 - 10:00 | 10:00 - 11:00 | | TALLY RESULT |
|---|---|---|---|---|
| USER A | +4(+5) | +2(0) | | +30 |
| USER B | +3(+4) | +4(+4) | | +24 |
| USER C | +2(0) | +3(+2) | | +15 |
| USER D | +1(-3) | +1(-2) | | +10 |

| RANK ORDER | USER |
|---|---|
| 1 | JOB OF USER B |
| 2 | JOB OF USER C |
| 3 | JOB OF USER A |
| 4 | JOB OF USER D |
| ... | ... |

| | 9:00 - 10:00 |
|---|---|
| USER A | +6 |
| USER B | +4 |

| | 9:00 - 10:00 |
|---|---|
| USER A | +5 |
| USER B | +4 |

FIG. 20
| SEPTEMBER 1 | SEPTEMBER 2 | SEPTEMBER 3 | SEPTEMBER 4 | SEPTEMBER 5 |
|---|---|---|---|---|
| TALLY PERIOD | ➔ PROVISION PERIOD | | | |
| | TALLY PERIOD | ➔ PROVISION PERIOD | | |
| | | TALLY PERIOD | ➔ PROVISION PERIOD | |
| | | | TALLY PERIOD | ➔ PROVISION PERIOD |
| | | | | TALLY PERIOD |
FIG. 21
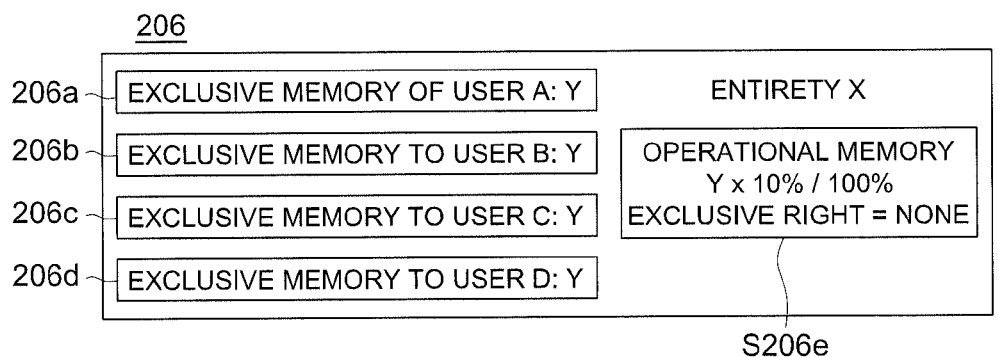
FIG. 22
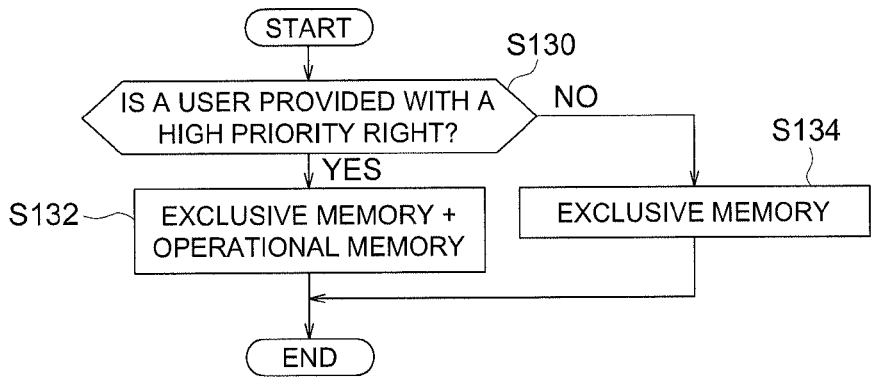

APPARATUS, SYSTEM, METHOD, AND MEDIUM FOR DATA ADMINISTERING WHICH ENABLE POWER SAVING BASED ON POWER-OFF INFORMATION

BACKGROUND OF THE INVENTION

The present invention relates to a data administering apparatus, an image forming system, a data administering method, and a recording medium storing data administering programs. In detail, a high priority right and a low priority right with regard to the execution rank order of a job, or a usable capacity of memories are given to users based on the number of times of power-off operations for an image forming apparatus, whereby the consciousness mind of the users for energy saving for the image forming apparatus is raised, and power-saving is attained efficiently.

In recent years, image forming apparatuses equipped with a plurality of functions, such as a printer, a facsimile, and a scanner are widely used. Two or more computers are connected to an image forming apparatus through the network, and the image forming apparatus predetermined processing, such as printing, is executed by the image forming apparatus based on a ob transmitted hum each of the computers (refer to Japanese Unexamined Patent Publication No. 2002-182885, Official report).

In this reference, an operation to turn from on to off for a power source of the image forming apparatus is conducted by direct operation for a power source button which is disposed on the image forming apparatus so as to turn on or off a power source. Accordingly, until a user conducts a power-off operation for the image forming apparatus by operating the power source button of the image forming apparatus, power such as waiting power is consumed. In contrast to this, in recent image forming apparatuses, a power save mode to suppress the power consumption of image forming apparatuses is provided. With the setup of this power save mode, if a predetermined time period is elapsed after the completion of operations such print jobs, an image forming apparatus is switched to a power save mode so as to seek power saving of the image forming apparatus.

As an image forming system equipped with such power saving mode, for example, a proposed printing system is structured such that a printing apparatus acquires the respective lease situations of IP addresses from a DHCP server apparatus when all printing jobs are completed, and shifts to a power save mode when all the acquired lease situations of IP addresses are expired (refer to Japanese Unexamined Patent Publication No. 2010-64253, Official report).

However, the conventional image forming systems disclosed in the above references have the following problems. In the general image forming apparatuses, a power-on state is continued until users directly turn off the power sources of the image forming apparatuses. Accordingly, in the case where processing of a job is not conducted for a predetermined time period, there is a problem that useless electric power is consumed more than needed power. On the other hand, also in the image forming apparatus in which a power save mode is set up, since the power source of the image forming apparatus is in an ON state until the setup time elapses, there is a problem that useless electric power is consumed until the switch-over time elapses.

SUMMARY OF THE INVENTION

Then, the present invention has been achieved in view of the above-mentioned problems, and an object of the present invention is to provide a data administering apparatus, an image forming system, a data administering method, and a recording medium storing data administering programs, which enable the power saving of an image forming apparatus to be attained efficiently.

In order to solve the above-mentioned problems, a data administering apparatus which is connected to a plurality of information processing apparatuses relating to the present invention and administers information which is transmitted from the information processing apparatuses in association with the image forming apparatus, includes a communicating section to receive power-off information which is transmitted from the information processing apparatuses and is to turn off a power source of the image forming apparatus, and a control section which administers the number of times of power-off of the image forming apparatus based on the power-off information received by the communicating section.

Further, an image forming system relating to the present invention is an image forming system in which a plurality of information processing apparatuses, a data administering apparatus, and an image forming apparatus are connected to each other; wherein each of the plurality of information processing apparatuses includes a communicating section to transmit power-off information to turn off a power source of the image forming apparatus, one of the data administering apparatus and the image forming apparatus includes a communicating section to receive the power-off information transmitted from the information processing apparatuses, and a control section which administers the number of times of power-off of the image forming apparatus based on the power-off information received by the communicating section.

Furthermore, a data administrating method relating to the present invention is a data administrating method in an image forming system in which a plurality of information processing apparatuses, a data administering apparatus, and an image forming apparatus are connected to each other, wherein each of the plurality of information processing apparatuses includes a communicating step of transmitting power-off information to turn off a power source of the image forming apparatus, one of the data administering apparatus and the image forming apparatus includes a communicating step of receiving the power-off information transmitted from the information processing apparatuses, and a control step of administering the number of times of power-off of the image forming apparatus based on the power-off information received by the communicating section.

Moreover, a record medium which stores a data administering program relating to the present invention, stores a data administering program used in a data administering apparatus connected to an information processing apparatus and an image forming apparatus, includes a communicating step of receiving the power-off information transmitted from the information processing apparatuses, and a control step of administering the number of times of power-off of the image forming apparatus based on the power-off information received by the communicating section.

In the present invention, the number of times of power-off based on the power-off information which is transmitted from an information processing apparatus and used to turn off a power source of an image forming apparatus, is administered by the control section. For example, the number of times of power-off which a user turns off a power source of the image forming apparatus by transmitting the power-off information, is counted as an energy saving contribution for energy saving in the image forming apparatus, and then a high priority right or a low priority right at the time of use of the image forming apparatus is provided based on this counted result. As specific examples of a high priority right and a low priority right, for example, the rank order of a job is moved up and moved down, or a usable capacity of a memory is increased and decreased.

In this regard, the data administering program of the present invention is a computer program that can be supplied to a general-purpose computer system capable of executing various program codes, via a recording medium to supply in a format capable of being read by the computer or a communication medium, for example, recording media, such as optical disk and magnetic disk, or communication media, such as a network. The supply of programs in the format capable of being read by a computer in the above way realizes processing corresponding to the program in a system.

Since the number of times of power-off of an image forming apparatus is administered, the consciousness mind of users for energy saving in image forming apparatuses can be raised. As a result, energy saving in an image forming apparatus can be attained efficiently.

BRIEF DESCRIPTION OF THE DRAWINGS

FIG. 4 is a schematic diagram showing a structural example of a power-off time administering data table.

FIG. 5 is a schematic diagram showing a structural example of an energy saving contribution providing table.

FIG. 6 is a schematic diagram showing a structural example of a point converting table.

FIG. 7 is a schematic diagram showing a structural example of a point spreadsheet.

FIG. 8 is a schematic diagram showing a structural example of a job schedule.

FIG. 20 is a schematic diagram showing a relationship between a tallying period and a providing period.

FIG. 21 is a schematic diagram showing a structural example of a memory section of a server in an image forming system according to the second embodiment of the present invention.

FIG. 22 is a flowchart showing an operational example of the server in the case where a high priority right is provided.

DETAILED DESCRIPTION OF THE PREFERRED EMBODIMENT

Hereafter, a best mode (hereafter, referred to as embodiment) for carrying out the invention will be described.

1. First Embodiment

[Structural Example of an Image Forming System]

Figure 1:
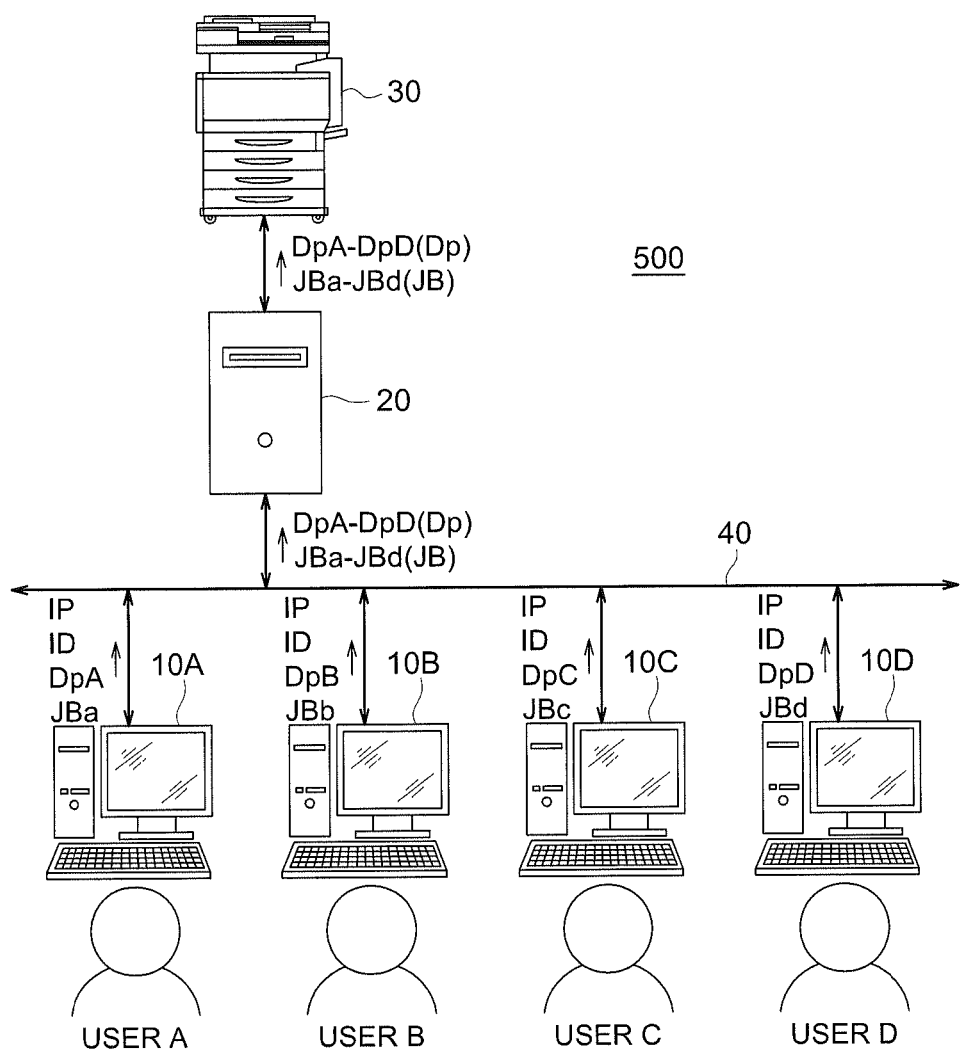
FIG. 1 is a schematic diagram showing an structural example of an image forming system according to the first embodiment of the present invention.

FIG. 1 shows an example of the structure of an image forming system 500 relating to the present invention. As shown in FIG. 1, the image forming system 500 is equipped with a plurality of information processing apparatus 10, a server 20, and an image forming apparatuses 30. In this example, explanation will be given the case where four information processing apparatus 10A, 10B, 10C, and 10D are used as the information processing apparatus 10. The plurality of information processing apparatus 10, the server 20, and the image forming apparatuses 30 are connected to each other so as to be able to communicate bidirectionally through a network 40, such as LAN (Local Area Network).

The information processing apparatus 10 is constituted by, for example, a common personal computer and the like, and configured to transmit a job JB and power-off information (power source off signal) Dp for turning off a power source of the image forming apparatus 30 in response to an input operation of a user to the server 20 through the network 40. A server 20 is an example of a data administering apparatus, and records and administers the job JB and the power-off information Dp which are transmitted from the information processing apparatus 10. For example, the server 20 counts the number of transmissions of the power-off information Dp transmitted from each of the information processing apparatus 10 in order to turn off the power source of the image forming apparatus 30, and administers the number of transmissions for each of the information processing apparatus 10. Based on the job JB and the power-off information Dp supplied from the server 20, the image forming apparatus 30 prints a specified image on a sheet, or turns off a power source. In this regard, the power-off of the image forming apparatus 30 includes power saving modes, such as sleep mode and a power save mode.

[Structural Example of an Information Processing Apparatus]

Figure 2:
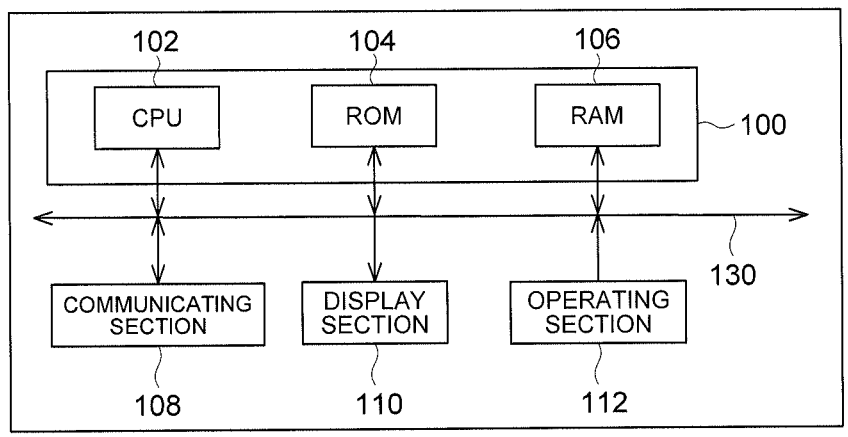
FIG. 2 is a schematic diagram showing a block structural example of an information processing apparatus.

Hereafter, since each of the four information processing apparatus 10A, 10B, 10C, and 10D has the same structure and function, explanation will be given the information processing apparatus 10A as a representative of them. FIG. 2 shows an example of the block configuration of the information processing apparatus 10A. As shown in FIG. 2, the information processing apparatus 10A includes a control section 100 configured to control the overall operations of the information processing apparatus 10A. The control section 100 includes CPU (Central Processing Unit) 102, and ROM (Read Only Memory) 104, and RAM (Random Access Memory) 106. The CPU 102 develops programs and data, which are read out from the ROM 104, on RAM 106, and controls the operations of each part of the information processing apparatus 10A on the basis of the programs.

In the control section 100, a communicating section 108 and a display section 110, and an operating section are connected to each other through a bus 130. The communicating section 108 is constituted by, for example, a modem, a router, and the like, establishes communication with the server 20 via the network 40, and transmits the job JBa and the power-off information DpA for turning off the power source of the image forming apparatus 30 based on instruction of the control section 100 to the server 20.

The display section 110 is constituted by, for example, a liquid crystal displays, and the like, and displays a operation screen for operating the image forming apparatus 30 based on image signals supplied from the control section 100. On the operation screen, displayed are, for example, setup buttons for performing various kinds of setup with regard to printing, such as a paper size, the printing number of sheets, and the like, a power button for turning on or turning off the power source of the image forming apparatus 30, and the like.

The operating section 112 is constituted by, for example, a keyboard, a mouse, and the like of a wire type or a wireless type, generates operation signals in accordance with input operations by a user, and supplies the operation signals to the control section 100. For example, the operating section 112 receives input information such as various kinds of setup with regard to a printing job and power on/off information for turning on and off the power source of the image forming apparatus 30 based on input operations by a user, generates operation signals corresponding to the input information, and supplies the operation signals to the control section 100. Therefore, the power source of the image forming apparatus 30 can be turned on or turned off by remote operations from the information processing apparatus 10. In this connection, a touch-panel type operating section which is assembled integrally with the display section 110 may be used for the operating section 112.

On the basis of the operation signals, supplied from the operating section 112, which indicate the various kinds of setup of a job JB and the power on/off information (hereafter, explanation will be given mainly the case of power-off) of the power source of the image forming apparatus 30, the control section 100 produces a job JBa to execute printing and power-off information DpA to turn off the power source of the image forming apparatus 30, and transmits them to the server 20. At this time, the control section 100 adds an IP address assigned to the information processing apparatus 10A and an user ID of the user A, who is using the information processing apparatus 10A, into the job JBa and the power-off information DpA, and supplies them to the server 20. The user A may input the user ID directly from the operating section 112, may input by bring an non-contact type IC card near to a reading apparatus.

[Structural Example of a Server]

Figure 3:
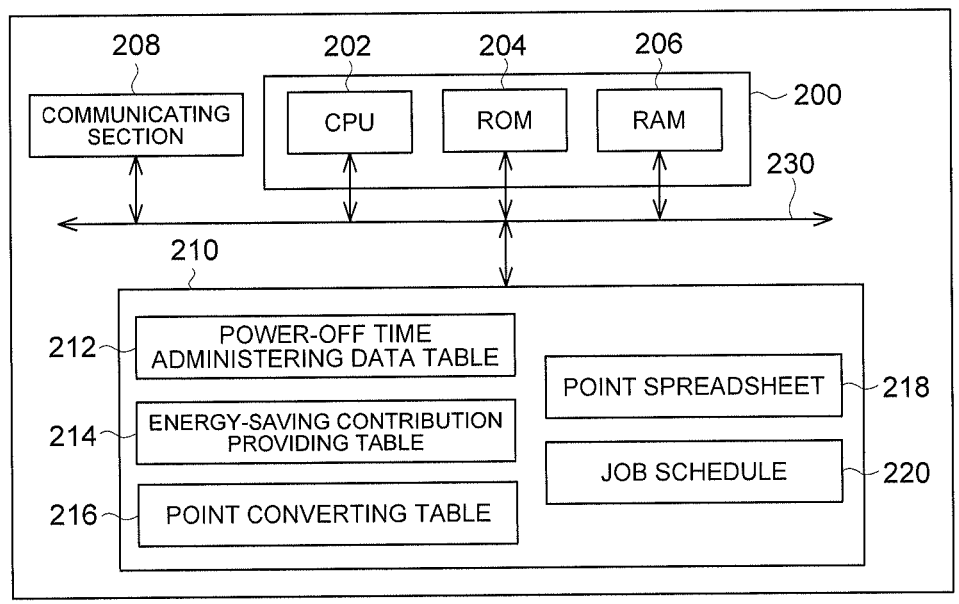
FIG. 3 is a schematic diagram showing a block structural example of a server.

FIG. 3 shows an example of the block configuration of the server 20. As shown in FIG. 3, the server 20 is equipped with a control section 200 which controls the overall operations of the server 20. The control section 200 includes CPU 202, ROM 204 and RAM 206. The CPU 202 develops programs and data, which are read out from the ROM 204, on the RAM 206, and controls the operations of each part of the server 20 on the basis of the programs.

The control section 200 records the power-off information Dp received by the communicating section 208 and an IP address and a user ID which are added to the power-off information Dp, counts the number of power-off operations for the image forming apparatus, 30 and administers the number of power-off operations and the power-off time for each user or each of the information processing apparatus 10. Further, as mentioned later, the control section 200 provides energy saving contribution (a degree of contribution for energy-saving) to the image forming apparatus 30 based on the number of power-off operations for each user, and then provides each user with a high priority right or a low priority right at the time of use of the image forming apparatus 30 on the basis of the result of tally of the energy saving contribution. At this time, the control section 200 does not administer only one of each user and each of the information processing apparatus 10, but may administer both the number of power-off operations and the power-off time of each user and the number of power-off operations and the power-off time of each of the information processing apparatus 10.

In the control section 200, a communicating section 208 and a memory section 210 are connected to each other The communicating section 208 is constituted by, for example, a modem, a router, and the like, establishes communication with the image forming apparatus 30, and acquires the job JB and the power-off information Dp supplied from the information processing apparatus 10 through a bus 230.

The memory section 210 is constituted by, for example, nonvolatile memories, such as semiconductor elements and HDD (Hard disk drive). The memory section 210 records a power-off time administration data table 212 which administers the acquisition time (the power-off instruction time) and the number of acquisitions of the power-off information, transmitted from each of the information processing apparatus 10, for turning off the power of the image forming apparatus 30, and a point spreadsheet 218. Further, the memory section 210 records an energy saving contribution provision table 214 which is used at the time of provision of energy saving contribution, a point conversion table, a job schedule 220, and the like. Furthermore, the memory section 210 records the IP address of the information processing apparatus 10 to identify the transmission source of the power-off information Dp and the user ID of the user being using the information processing apparatus 10 with correlation.

[Structural Example of a Power-Off Time Administration Data Table]

FIG. 4 shows an example of the structure of the power-off time administration data table 212 recorded in the memory section 210 of the server 20. As shown in FIG. 4, in the power-off time administration data table 212, the name of each of users using respectively the information processing apparatus 10 and the time (hereafter, referred to as power-off time) when each of the users operates to turn off the power source of the image forming apparatus 30, in more detail, the time when the sever 20 receives the power-off information, are correlated with each other and recorded. The power-off time is time within a predetermined recording time period and is recorded separately for each unit time. The recording time period and the unit time may be set arbitrarily by the operating section 112. The recording time period may be, for example, working hours from the viewpoint of fairness, and the unit time may be, for example, one hour.

Further, as the power-off time, each of the time when the same user as the user who transmits a job JB operates to turn off the power source of the image forming apparatus 30 after transmission of the job JB, the time when the user who has not transmitted a job JB operates to turn off the power source of the image forming apparatus 30 on the condition that the power source is turned on, and the time when a user cannot operate to turn off the power source of the image forming apparatus 30 because another user transmits another job JB after the user transmitted a job JB, are separately recorded.

For example, in a user A, "9:02", "9:32", "9:48", and "9:57" are recorded as the time that the user A operated to turn off the power of the image forming apparatus 30 after the transmission of the job of the user A itself during a period from 9:00 to 10:00. Further, "9:06" and "9:20" are recorded as the time that the user A operated to turn off the power of the image forming apparatus 30 though the user A itself did not transmit a job during a period from 9:00 to 10:00. Subsequently, during a period from 10:00 to 11:00, the information in the case where the user A was not able to operate to turn off the power source of the image forming apparatus 30 because other users B, C, and D transmit jobs JBb, JBc, and JBd after the user A transmitted one owns job JB, is recorded.

[Structural Example of an Energy Saving Contribution Provision Table]

FIG. 5 shows an example of the structure of the energy saving contribution provision table 214 recorded in the memory section 210 of the server 20. An energy saving contribution is an index for indicating a degree of contribution for saving power of the image forming apparatus 30, and a predetermined contribution is given to a user in accordance with the number of power-off operations for the image forming apparatus 30. In this example, a high energy saving contribution (point) is given to a user with the large number of times of power-off operations for an image forming apparatus.

As shown in FIG. 5, in the energy saving contribution provision table 214, the condition indicating whether the power source of the image forming apparatus 30 is turned off, whether a job JB is executed, the condition of the power source of the image forming apparatus 30, the energy saving contribution, and the primary point corresponding to the energy saving contribution are correlated with each other and memorized.

For a user who operated to turn off the power source of the image forming apparatus 30, the energy saving contribution "No. 1" is given irrespective of whether a job JB was transmitted, and the user is provide with a primary point of "+1" corresponding to the number of times of power-off operations. For a user who was not able to operate to turn off the power source of the image forming apparatus 30 because of transmission (execution) of a job JB by other users, the energy saving contribution "No. 2" is given, and the user is provide with a primary point of "0" corresponding to the number of times of power-off operations. For a user who did not operate to turn off the power source of the image forming apparatus 30 after transmission of a job JB, the energy saving contribution "No. 3" is given, and the user is provide with the lowest primary point of "−1" in consideration of the number of times of power-off operations and the energy saving contribution.

[Structural Example of a Point Conversion Table]

FIG. 6 shows an example of the structure of the point conversion table 216 recorded in the memory section 210 of the server 20. As shown in FIG. 6, the primary points given based on the energy saving contribution in the energy saving contribution provision table 214 and secondary points used at the time of provision of a high priority right and a low priority right are correlated to each other, recorded, and administered as point tally data.

For example, a user who has the largest total of the primary points per unit time, that is, the largest number of times of power-off operations, is provided with a secondary point of "+4", a user who has the second largest total of the primary points per unit time, is provided with a secondary point of "+3", a user who has the third largest total of the primary points per unit time, is provided with a secondary point of "+2", and a user who has the fourth largest total of the primary points per unit time, is provided with a secondary point of "+1". Of course, the secondary point is suitably set up so as to match with the number of users.

[Structural Example of a Point Spreadsheet]

FIG. 7 shows an example of the structure of the point spreadsheet 218 recorded in the memory section 210 of the server 20. As shown in FIG. 7, in the point spreadsheet 218, the name of each of the users who use respectively the information processing apparatus 10, the secondary points converted from the primary points in the point conversion table 216, and the result of tally in which the secondary points given for every unit time are tallied for each unit time and each user, are correlated with each other and recorded. In this regard, the primary point is shown in a parenthesis indicated next to the secondary point.

For example, in the user A, during a time period from 9:00 to 10:00, the secondary point "+4" given based on the number of times of power-off operations for the image forming apparatus 30 is recorded; during a time period from 10:00 to 11:00, the secondary point "+2" given based on the number of times of power-off operations for the image forming apparatus 30; and then, the secondary point "+30" is recorded as the final result of tally. This point spreadsheet 218 can be displayed on the display section 110 of each of the information processing apparatuses 10, so that a user can confirm the energy saving contribution to the image forming apparatus 30.

[Structure Example of a Job Schedule]

FIG. 8 shows an example of the structure of the job schedule 220 administered by the memory section 210 of the server 20. As shown in FIG. 8, in the job schedule 220, the jobs JB transmitted from each of the information processing apparatuses 10 are administered in the order that the respective jobs JB are received by the server 20. Then, the jobs JB are supplied to the image forming apparatus 30 in the rank order of the job schedule 220, and the image formation processing is performed based on each of the jobs JB. In this example, the rank order of a job JB of a user provided with a high priority right is given priority or is moved up over the other jobs, and the rank order of a job JB of a user provided with a low priority right is postponed or moved down.

[Structural Example of an Image Forming Apparatus]

Figure 9:
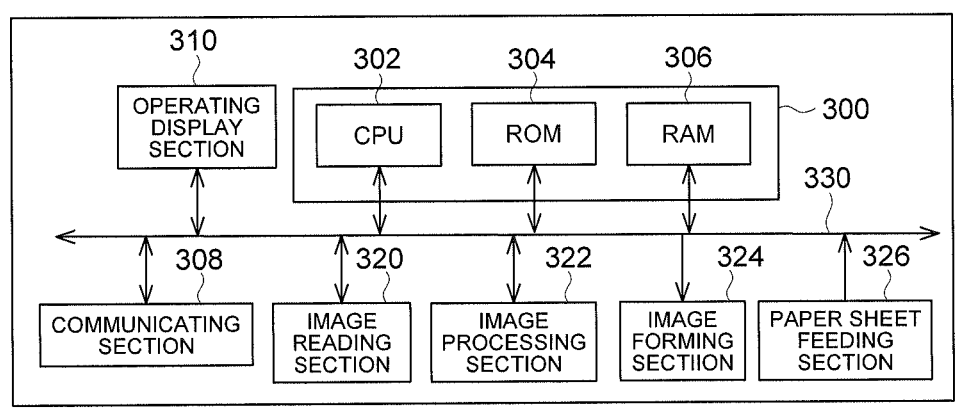
FIG. 9 is a schematic diagram showing a block structural example of an image forming apparatus.

FIG. 9 shows an example of a block configuration of the image forming apparatus 30. As shown in FIG. 9, the image forming apparatus 30 has a control section 300 which controls the overall operations of the image forming apparatus 30. The control section 300 includes a CPU 302, a ROM 304, and a RAM 306. The CPU 302 develops programs and data, which are read out from the ROM 304, on the RAM 306, and controls the operations of each part of the image forming apparatus 30 on the basis of the programs.

In the control section 300, a communicating section 308, an operation display section 310, an image reading section 320, an image processing section 322, an image forming section 324, and a sheet feeding section 326 are connected to each other through a bus 330. The communicating section 308 is constituted by, for example, a modem, a router, and the like, establishes communication with the server 20, and receives the job JB and the power-off information Dp supplied from the server 20.

The image reading section 320 scans a document placed on a document stand with a laser beam, converts light reflected on the document into electrical signals by an image sensor, produces image data by performing A/D conversion for the electrical signals, and supplies the image data to the image processing section 322. The image processing section 322 performs, for example, analog processing for the image data supplied from the image reading section 320, and then supplies the processed image data to the image forming section 324.

In the image forming section 324, with an electro-photographing technique, a photoreceptor drum is electrically charged by an electrically charging section, the charged photoreceptor drum is irradiated with laser light emitted from an exposure section so as to form a latent image, the latent image on the photoreceptor drum is developed with toner by a developing section so as to form a toner image, and the developed toner image is transferred onto a recording sheet fed from a sheet feeding section 326.

The operation display section 310 is constituted by a display device such as a liquid crystal panel and a position input device of a pressure-sensitive type or an electrostatic type 1 which are combined into one body, is configured to detect a position pressed on a screen of the display device, produces operation signals corresponding to the detected position, and supplies the operation signals to the control section 300.

The control section 300 executes an image forming process such as printing on the basis of the job JB received by the communicating section 308, and makes the main a main power source into an OFF state based on the power-off information Dp received by the communicating section 308. When power ON information Dpo is transmitted, the main power supply is made into an ON state. Further, the control section 300 has energy saving modes, such as a sleep mode, and in the ease where a energy saving mode is set up, when no job JB is conducted for a predetermined time period, the control section 300 transfer the current mode to the energy saving mode, and subsequently, when a job JB is transmitted form an information processing apparatus 10, the control section 300 return the energy saving mode to an ordinary mode.

[Operational Example of the Server in the Case of Provision of an Energy Saving Contribution]

Figure 10:
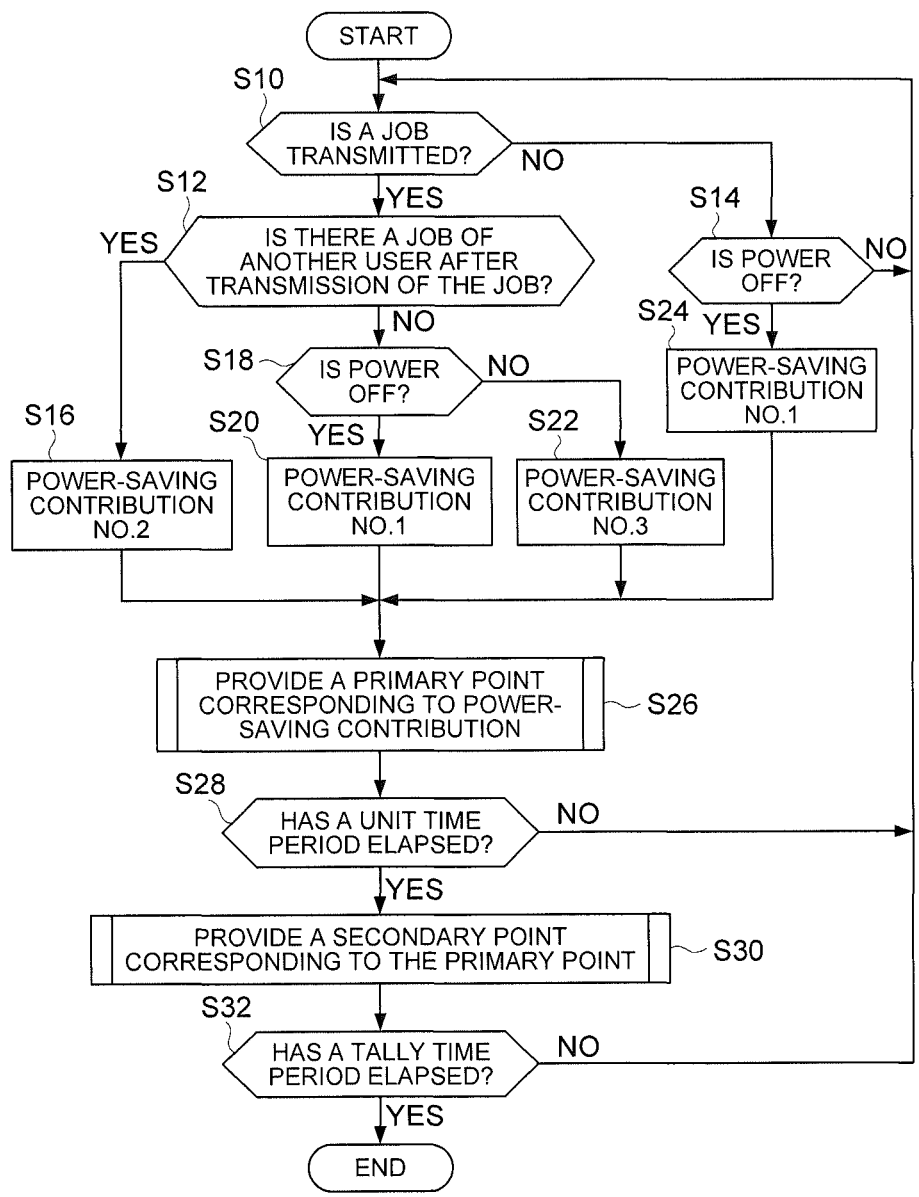
FIG. 10 is a flowchart showing an operational example of the server at the time of provision of an energy saving contribution and a point based on the number of times of power-off in the image forming apparatus.

Next, an example of operations of the server 20 will be explained. FIG. 10 is a flowchart which shows the operational example of the CPU 202 of the server 20 at the time of provision of an energy saving contribution. In the following examples, as shown in FIG. 1, explanation will be mainly given for the case where a user A uses the information processing apparatus 10A, and transmits a job JBa and power-off information DpA from the information processing apparatus 10A.

As shown in FIG. 10, at Step S10, the CPU 202 judges whether a job JBa is transmitted from the information processing apparatus 10A. For example, the CPU 202 checks the IP address or the user ID added to the job JBa, thereby judging whether a job JBa is transmitted from the information processing apparatus 10A. When the CPU 202 judges that a job JBa is transmitted from the information processing apparatus 10A, the processing proceeds to Step S12, and when the CPU 202 judges that a job JBa is not transmitted from the information processing apparatus 10A, the processing proceeds to Step S14.

At Step S12, the CPU 202 judges whether any one of other jobs JBb, JBc, and JBd is transmitted from the other information processing apparatuses 10B, 10C, and 10D different from the information processing apparatus 10A. Based on the IP address or the user ID added to a received job JB, the CPU 202 judges whether the received job JB is transmitted from the other information processing apparatuses 10B, 10C, and 10D different from the information processing apparatus 10A. Then, when the CPU 202 judges that at least one of other jobs JBb, JBc, and JBd is transmitted after the reception of the job JBa, the processing proceeds to Step S16, and when the CPU 202 judges that other jobs JBb, JBc, and JBd are not transmitted, the processing proceeds to Step S18.

At Step S16, when the CPU 202 receives at least one of other jobs JBb, JBc, and JBd after reception of the job JBa from the information processing apparatus 10A, the CPU 202 provides the energy saving contribution "No. 2" to the user A of the information processing apparatus 10A with reference to the energy saving contribution provision table 214 shown in FIG. 5. The reason why is as follows. That is, when at least one of other jobs JBb, JBc, and JBd is transmitted after the transmission of the job JBa of itself, the user A cannot conduct a power-off operation for the image forming apparatus 30 due to the execution of the transmitted job if the user A wants to conduct a power-off operation. Therefore, on the presupposition that the user A conducts a power-off operation for the image forming apparatus 30 after the transmission of the job JBa, the energy saving contribution "No. 2" is provided to the user A.

On the other hand, when jobs JBb, JBc, and JBd are not transmitted from the other information processing apparatuses 10B, 10C, and 10D, at Step S18, the CPU 202 judges whether power-off information DpA to turn off the power source of the image forming apparatus 30 further is transmitted after the transmission of the job JBa from the information processing apparatus 10A. Whether the power-off information is transmitted from the same information processing apparatus 10A can be judged by whether the IP address and the user ID added to the power-off information DpA coincide with the IP address and the user ID added to the job JBa. At this time, when the power-off information DpA is transmitted continuously from the same information processing apparatus 10A, the continued power-off information DpA is made not to be counted. Subsequently, when the CPU 202 judges that the power-off information DpA is transmitted from the information processing apparatus 10A, the processing proceeds to Step S20, and when the CPU 202 judges that the power-off information DpA is not transmitted from the information processing apparatus 10A, the processing proceeds to Step S22.

At Step S20, in the case where the power-off information DpA is transmitted from the information processing apparatus 10A after the transmission of the job JBa, the CPU 202 gives the energy saving contribution "No. 1" to the user A of the information processing apparatus 10A with reference to the energy saving contribution provision table 214 shown in FIG. 5. In contrast, in the case where the power-off information DpA is not transmitted from the information processing apparatus 10A after the transmission of the job JBa, at Step S22, the CPU 202 gives the energy saving contribution "No. 3" to the user A of the information processing apparatus 10A with reference to the energy saving contribution provision table 214 shown in FIG. 5.

On the other hand, when the job JBa is not transmitted from the information processing apparatus 10A, at Step S14, the CPU 202 judges whether the power-off information DpA to turn off the power source of the image forming apparatus 30 is transmitted from the information processing apparatus 10A. For example, when the power source of the image forming apparatus 30 is an ON state, there may be a case where a power-off operation may be conducted for the image forming apparatus 30 for the purpose of contributing to power-saving of the image forming apparatus 30 without transmission of a job JBa to the image forming apparatus 30. Whether the power-off information DpA is transmitted from the information processing apparatus 10A can be judged by the IP address or user ID added to the power-off information DpA. When the CPU 202 judges that the power off information DpA is transmitted from the information processing apparatus 10A, the processing proceeds to Step S24. At Step S24, the energy saving contribution "No. 1" is given to the user A of the information processing apparatus 10A with reference to the energy saving contribution provision table 214 shown in FIG. 5. On the other hand, when the CPU 202 judges that the power-off information DpA is no transmitted from the information processing apparatus 10A, the processing returns to Step S10, and the processing is made to a waiting state until a job JBa is transmitted from the information processing apparatus 10A.

Figure 11:
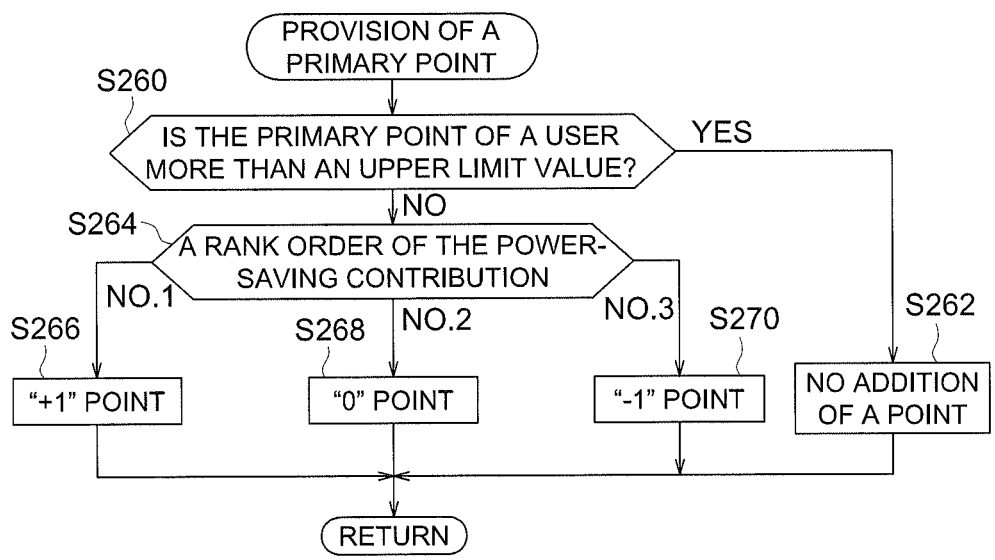
FIG. 11 is a flowchart showing an operational example of the server at the time of provision of a primary point.

After provision of an energy saving contribution is completed, at Step S26, the CPU 202 gives a primary point corresponding to an energy saving contribution. FIG. 11 shows a subroutine which shows an example of operations of the server 20 in the case of provision of a primary point. As shown in FIG. 11, at Step S260, the CPU 202 judges whether the primary point given to the user A who uses the information processing apparatus 10A is over the upper limit set up beforehand. When CPU 202 judges that the primary point exceeds the upper limit set up beforehand, the processing proceeds to step S262.

Figure 12:
FIG. 12 is a flowchart showing an operational example of the server in the case where the primary point exceeds the upper limit.

In the case where the CPU 202 judges that the primary point exceeds over the upper limit, the CPU 202 controls not to give a primary point to the information processing apparatus 10A even if the energy saving contribution given to the information processing apparatus 10A is high ("No. 1"). That is, the number of times of power-off operations beyond the upper limit is not counted. FIG. 12 shows the case where the primary point given to the user A exceeds the upper limit. In this example, the upper limit of the primary point is set as "+5". For example, if the primary point of the user A becomes "+6" during a period from 9:00 to 10:00, since the primary point exceeds the upper limit "+5" of the primary point, the primary point is not added with any more, and kept at "+5" of the maximum.

On the other hand, when the primary point given to the information processing apparatus 10A is below the upper limit set beforehand, the CPU 202 discriminates the rank of the energy saving contribution given to the information processing apparatus 10A. Then, when the energy saving contribution is "No. 1", the processing proceeds to Step S266, when the energy saving contribution is "No. 2", the processing proceeds to Step S268, and when the energy saving contribution is "No. 3", the processing proceeds to Step S270.

At Step S266, when the user A of the information processor 10A gains the energy saving contribution "No. 1", the CPU 202 gives the primary point "+1" to the user A based on the number of times of power-off operation of the user A with refer mice to the energy saving contribution providing table 214 shown in FIG. 5.

At Step S268, when the user A of the information processor 10A gains the energy saving contribution "No. 2", the CPU 202 gives the primary point "0" to the user A based on the number of times of power-off operation of the user A with reference to the energy saving contribution providing table 214 shown in FIG. 5.

At Step S270, when the user A of the information processor 10A gains the energy saving contribution "No. 3", the CPU 202 gives the primary point "−1" to the user A based on the number of times of power-off operation of the user A with reference to the energy saving contribution providing table 214 shown in FIG. 5. When such a series of operations for provision of the primary point are completed, the processing proceeds to Step S28.

As shown in FIG. 10, at Step S28, the CPU 202 judges whether the unit time (for example, 1 hour) set up beforehand has elapsed. The unit time can be arbitrarily set up, for example by operations of the operating section 112 of the information processing apparatus 10A, or the operation display section 310 of the image forming apparatus 30. If the CPU 202 judges that the unit time has elapsed, the processing proceeds to step S30. On the other hand, if the CPU 202 judges that the unit time has not elapsed, the processing returns to Step S10, and the operations mentioned above are executed repeatedly within the unit time.

Figure 13:
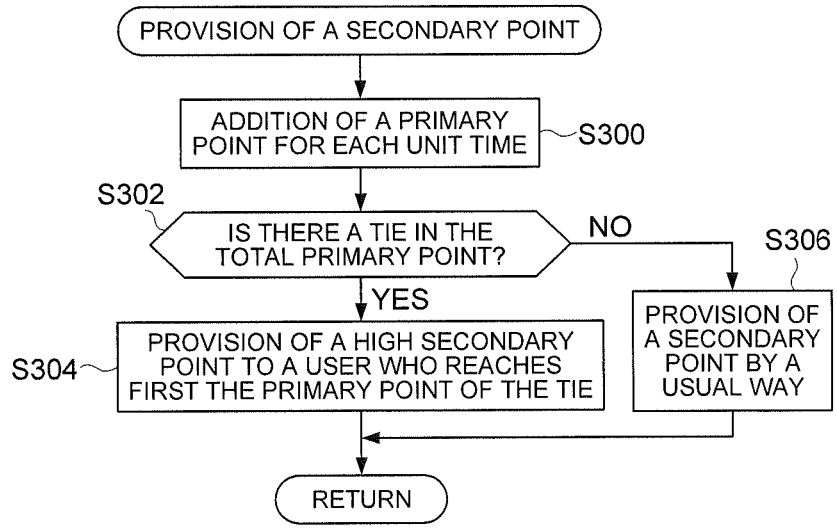
FIG. 13 is a flowchart showing an operational example of the server at the time of provision of a secondary point.

At step S30, the CPU 202 provides a secondary point corresponding to the primary point. FIG. 13 shows a subroutine which indicates an example of operations of the server 20 in the case of provision of the secondary point. As shown in FIG. 13, at Step S300, the CPU 202 conducts arithmetic processing, such as addition and subtraction, for the primary points for each unit time by use of the power-off time administration data table 212 and the energy saving contribution providing table 214 so as to calculate the sum of the primary points.

At step S302, the CPU 202 judges whether there is any tie in the addition results of the added primary points of the respective users. When the CPU 202 judges that there is a tie in the tally results of the added primary points of the respective users, the processing proceeds to step S304, and when the CPU 202 judges that there is no tie, the processing proceeds to step S306.

At Step S304, the CPU 202 specifies a user whose first point first reaches a tie, and gives a high secondary point to the specified user with reference to the point conversion table 216 shown in FIG. 6. At this time, the CPU 202 gives the other users ordinary secondary points corresponding to the primary points. On the other hand, when there is no tie, at Step S306, the CPU 202 gives secondary points corresponding to the primary points based on the number of power-off operations for the image forming apparatus 30 with reference to the point conversion table 216 shown in FIG. 6. When such a series of operations to provide secondary points is completed, the processing proceeds to Step S32 shown in FIG. 10.

At step S32, the CPU 202 judges whether the tally period (for example, 9:00 to 17:00) set up beforehand has elapsed. When the CPU 202 judges that the tally period has elapsed, the CPU 202 finishes a series of operations, and when the CPU 202 judges that the tally period has not elapsed, the processing returns to Step S10, and the CPU 202 conduct provision of points and energy saving contribution based on the number of power-off operations of respective users for the following unit time. In the example mentioned above, the explanation is made with reference to only the user A of the information processing apparatus 10A. However, the secondary points are given also to the other information processing apparatus 10B, 10C, and 10D and the users B, C, and D by the same operations.

[Operational Examples of the Server in the Case of Provision of a High Priority Right and a Low Priority Right for Users]

Figure 14:
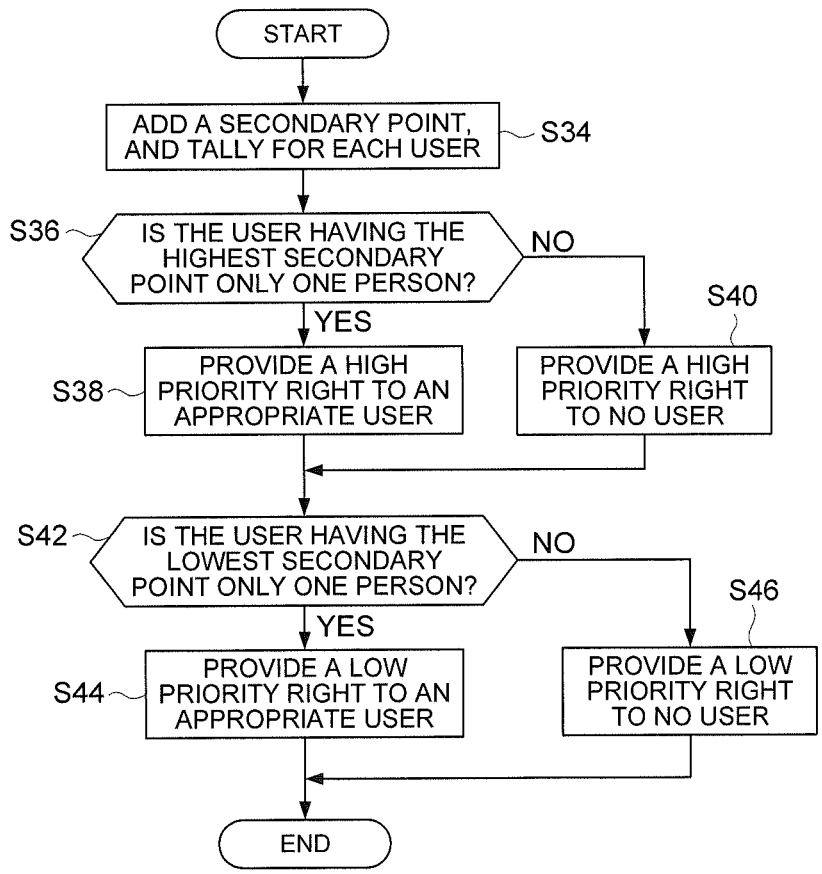
FIG. 14 is a flowchart showing an operational example of the server at the time of provision of a high priority right and a low priority right.

FIG. 14 is a flowchart which shows an example of operations of the server 20 in the case of provision of a high priority right and a low priority right. As shown in FIG. 14, at Step S34, the CPU 202 tallies the total point of the secondary point for respective users by conducting addition processing for the secondary points for every unit time, thereby producing the point spreadsheet 218 shown in FIG. 7.

At Step S36, the CPU 202 judges with reference to the point spreadsheet 218 whether the user having the highest secondary point is only one person. When the CPU 202 judges that the user having the highest secondary point is one person, the processing proceeds to step S38, and the CPU 202 judges that the user having the highest secondary point is more than one person, the processing proceeds to step S40.

At step S38, the CPU 202 gives a high priority right to a user having the highest secondary point. Actually, the CPU 202 records the user ID (the first identification information) of the user having the highest secondary point or the IP address (the second identification information) of the information processing apparatus 10 used by the user as a high priority right eligible person in a memory section 210. Subsequently, when a job JB is transmitted from one of the information processing apparatuses 10, the CPU 202 judges whether a user ID or an IP address added to the transmitted job JB coincides with the user ID or the IP address of the high priority right eligible person, and the CPU 202 specifies, base on the judgment result, whether the user is the high priority right eligible person. The treatment of the job JB of the user provided with the high priority right will be described later.

On the other hand, when the user having the highest secondary point is more than one person, at Step S40, the CPU 202 does not provide a high priority right to any one of the users. This is because the provision of a high priority right to only one person can increase a sense of emulation more among the users. Of course, when the user having the highest secondary point is more than one person, a high priority right can be provided to those users more than one person. Further, when all the users have the same point, a high priority right and a low priority right may not be provided to any one of the users.

Successively, at step S42, the CPU 202 judges whether the user having the lowest secondary point is more than one person with reference to the point spreadsheet 218. When the CPU 202 judges that the user having the lowest secondary point is one person, the processing proceeds to step S44, and the CPU 202 judges that the user having the lowest secondary point is more than one person, the processing proceeds to step S46.

At step S44, the CPU 202 gives a low priority right to a user having the lowest secondary point. Actually, the CPU 202 records the user ID of the user having the lowest secondary point or the IP address of the information processing apparatus 10 used by the user as a low priority right eligible person in the memory section 210. Subsequently, when a job JB is transmitted from one of the information processing apparatuses 10, the CPU 202 judges whether a user ID or an IP address added to the transmitted job JB coincide with the user ID or the IP address of the low priority right eligible person, and the CPU 202 specifies, base on the judgment result, whether the user is the low priority right eligible person. The treatment of the job JB of the user provided with the low priority right will be described later.

On the other hand, when the user having the lowest secondary point is more than one person, the CPU 202 does not provide a low priority right to any one of the users. This is because the provision of a low priority right to only one person can increase a sense of emulation more among the users. Of course, when the user having the lowest secondary point is more than one person, a low priority right can be provided to those users more than one person. The server 20 repeats such a series of operations.

[Operational Examples of the Server at the Time of Provision of a High Priority Right to a User]

Figure 15:
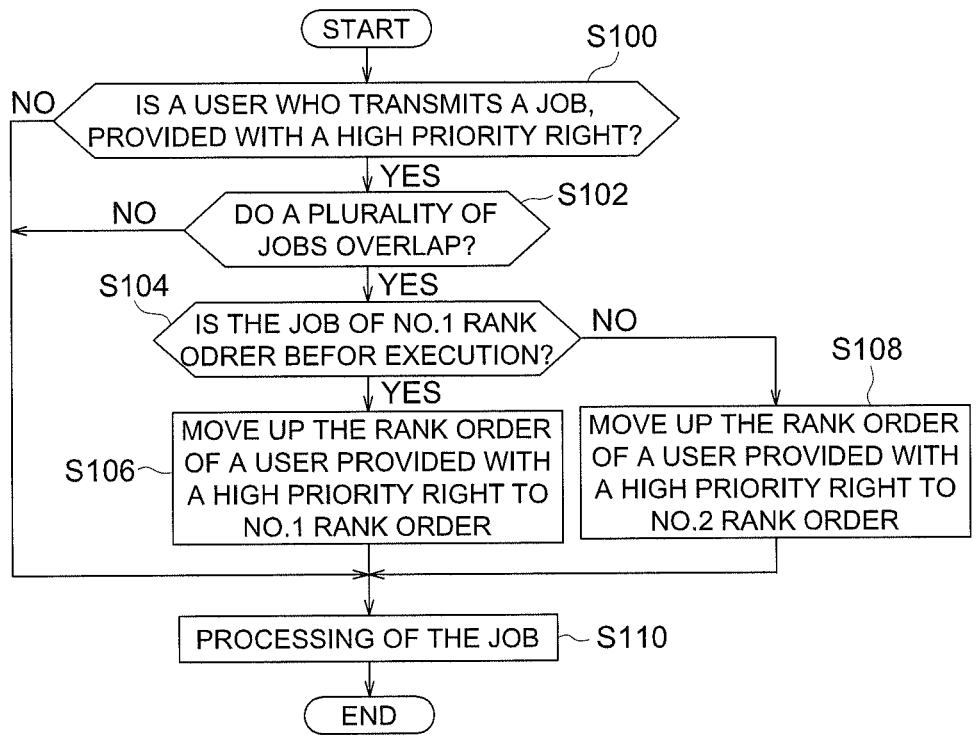
FIG. 15 is a flowchart showing an operational example of the server in the case where a high priority right is provided.

FIG. 15 is a flowchart which shows an example of operations of the server 20 at the time of provision of a high priority right to a user. As shown in FIG. 15, at Step S100, the CPU 202 judges whether a high priority right is provided to a user who transmits a job JB. Actually, the CPU 202 judges whether a user ID or an IP address added to the received job JB coincide with the user ID or the IP address of the high priority right eligible person registered beforehand. When the CPU 202 judges that the user ID or the IP address coincides with each other, the CPU 202 judges that the user who transmitted the job is provided with a high priority right, and then the processing proceeds to Step S102. On the other hand, when the CPU 202 judges that the user ID or the IP address does not coincide with each other, the CPU 202 judges that the user who transmitted the job is not provided with a high priority right, and then the processing proceeds to Step S110.

At Step S102, the CPU 202 judges with reference to a job schedule 220 whether a plurality of jobs overlap or are waiting for processing among reserved jobs in a job schedule 220. That is, the CPU 202 judges whether other jobs JB exist besides the job JB of the user provided with the high priority right. When the CPU 202 judges that a plurality of jobs overlap among reserved jobs, the processing proceeds to Step S104, and when the CPU 202 judges that a plurality of jobs do not overlap among reserved jobs, the processing proceeds to Step S110.

At step S104, the CPU 202 judges whether a leading job JB in the job schedule 220 is in a situation before execution. When the CPU 202 judges that leading job JB is in a situation before execution, the processing proceeds to step S106, and the CPU 202 judges that leading job JB is in a situation during execution, the processing proceeds to Step S108.

Figure 16:
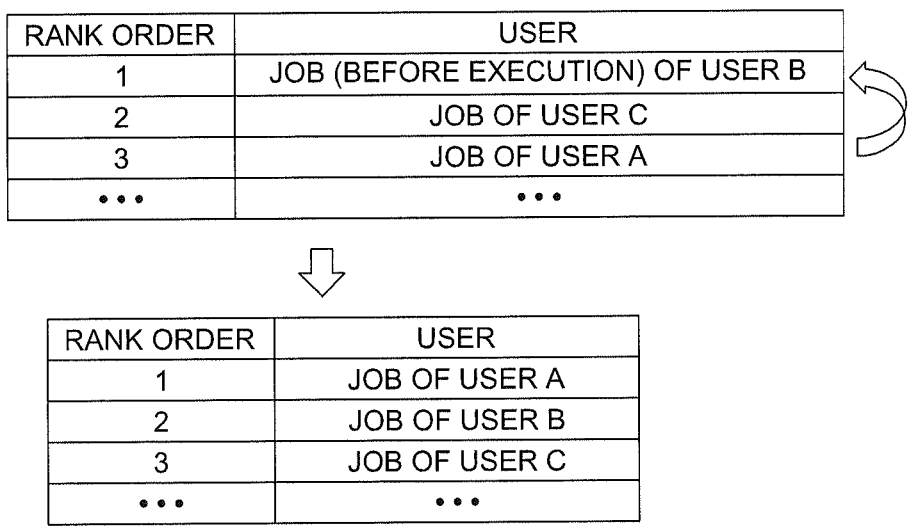
FIG. 16 is a schematic diagram for explaining an operational example (No. 1) of the server in the case where a job rank order of a job schedule is changed.

At step S106, when the leading job JB is in the state before execution, the CPU 202 moves up the rank order of the job JB of the user provided with the high priority right to a leading position, and processes the job JB preferentially rather than other jobs JB. FIG. 16 shows an example of processing (No. 1) of the job JB of the user provided with the high priority right. In FIG. 16, it is assumed that the user A is provided with a high priority right, the job JBb of the user B and the job JBc of the user C have been transmitted previously to the server 20, and these jobs JBb and JBc are in the situation before execution. As shown in FIG. 16, when the server 20 receives a job JBa of the user A, the CPU 202 conducts processing so as to move us the job rank order of the job JBa of the user A to a leading job, and to put off the respective job rank orders of the job JBb of the user B and the job JBc of the user C by one rank.

Figure 17:
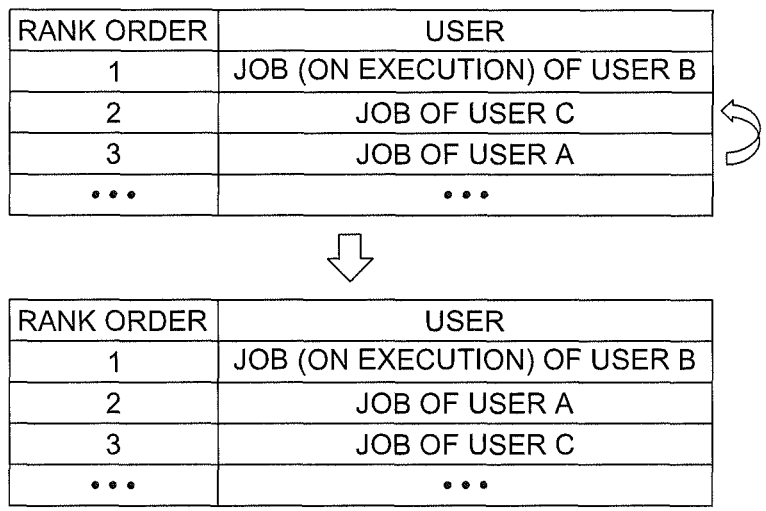
FIG. 17 is a schematic diagram for explaining an operational example (No. 2) of the server in the case where a job rank order of a job schedule is changed.

On the other hand, in the case where the leading job JB is in the situation under execution, at Step S108, the CPU 202 moves up the job JB of a user provided with a high priority right to the job rank order (the second) next to the job rank order of the leading job JB in the situation under execution, thereby processing the job JB preferentially rather than other jobs JB. FIG. 17 shows an example of processing (No. 2) of a job of a user provided with a high priority right. In FIG. 17, it is assumed that the user A is provided with a high priority right, the job JBb of the user B, the job JBc of the user C have been transmitted previously to the server 20, and the job JBb of the user B is in the situation under execution. As shown in FIG. 17, when the server 20 receives a job JBa of the user A, the CPU 202 moves up the job rank order of the job JBa of the user A next to the job rank order of the job JBb of the user B in the situation under execution, and to put off the job rank order of the job JBc of the user C.

Returning to FIG. 15, at Step S110, the CPU 202 supplies the job JB of each of the users to the image forming apparatus 30 sequentially based on the job rank order in the job schedule 220. With this, image formation processing corresponding to the content of each job JB is conducted in the image forming apparatus 30.

[Operational Examples of the Server at the Time of Provision of a Low Priority Right to a User]

Figure 18:
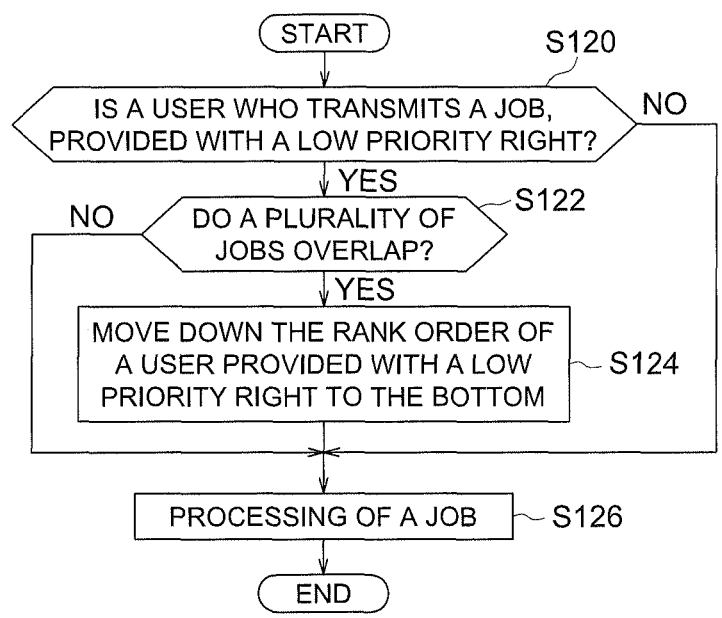
FIG. 18 is a flowchart showing an operational example of the server in the case where a low priority right is provided.

FIG. 18 is a flowchart which shows an example of operations of the server 20 at the time of provision of a low priority right to a specific user. As shown in FIG. 18, at Step S120, the CPU 202 judges whether a low priority right is provided to a user who transmits a job JB. Actually, the CPU 202 judges whether a user ID or an IP address added to the received job JB coincide with the user ID or the IP address of the low priority right eligible person registered beforehand. When the CPU 202 judges that the user ID or the IP address coincides with each other, the CPU 202 judges that the user who transmitted the job is provided with a low priority right, and then the processing proceeds to Step S122. On the other hand, when the CPU 202 judges that the user ID or the IP address does not coincide with each other, the CPU 202 judges that the user who transmitted the job is not provided with a high priority right, and then the processing proceeds to Step S126.

At Step S122, the CPU 202 judges with reference to a job schedule 220 whether a plurality of jobs overlap or are waiting for processing among reserved jobs in a job schedule 220. For example, after reception of the job JB of the user provided with the high priority right, the CPU 202 judges whether the jobs JB of the other users are received. When the CPU 202 judges that a plurality of jobs overlap among reserved jobs, the processing proceeds to Step S124, and when the CPU 202 judges that a plurality of jobs do not overlap to each other among reserved jobs, the processing proceeds to Step S126.

Figure 19:
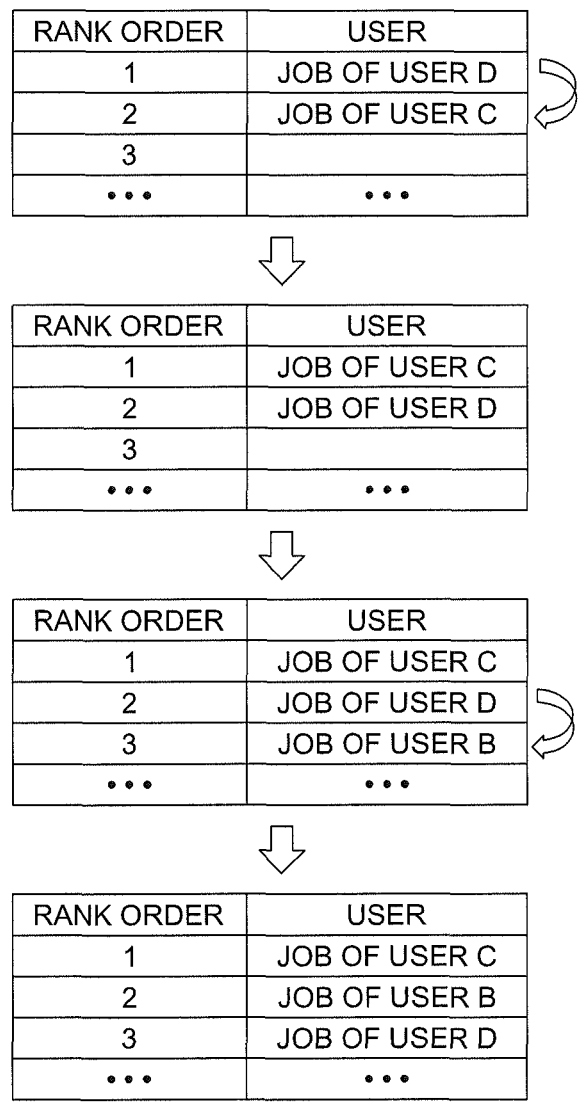
FIG. 19 is a schematic diagram for explaining an operational example of the server in the case where a job rank order of a job schedule is changed.

At step S124, the CPU 202 moves the job of the user provided with a low priority right to a trailing rank order, and executes preferentially jobs JB of the other users transmitted newly from the server 20, FIG. 19 shows an example of processing of the job JB of the user provided with a low priority right. In FIG. 16, it is assumed that the user D is provided with a low priority right, and the job JBb of the user B and the job JBc of the user C are transmitted after reception of the job JBd of the user D. As shown in FIG. 19, when the server 20 receives a job JBc of the user C after reception of the job JBd of the user D being a low priority right registering person, the CPU 202 moves the job JBd of the user D to the trailing rank order, and moves up the job JBc of the user C to the leading rank order. Thereafter, when the server 20 receives a job JBb of the user B, the CPU 202 moves the job JBd of the user D further to the trailing rank order, and moves up the job JBb of the user B to the second rank order next to the leading rank order.

Returning to FIG. 18, at Step S126, the CPU 202 supplies the job JB of each of the users to the image forming apparatus 30 sequentially based on the job rank order in the job schedule 220. With this, image formation processing corresponding to the content of each job JB is conducted in the image forming apparatus 30.

FIG. 20 shows an example of the relationship between the tallying period of the energy saving contribution (point) based on the number of times of power-off operations for the image forming apparatus 30 and the providing period which provides a high priority right and a low priority right. The server 20 feeds backs advantages such as preferential processing of the job JB as a high priority right and a low priority right on the next day with reference to tally results based on the energy saving contribution tallied on the day. Namely, in the high priority right and low priority right providing period, the energy saving contribution is tallied based on the number of times of power-off operations during this period, and advantages such as preferential processing of the job JB as a high priority right and a low priority right are fed back based on the tally results to each of the users on the next day. In this way, a tallying period and a providing period are performed repeatedly alternately. In the above example, a tallying period and a providing period are performed on the basis of day. However, such periods are performed on the basis of hour.

As explained above, according to the first embodiment, since the number of times of power-off of the image forming apparatus 30 is administered, conscious mind of users for energy saving for an image forming apparatus can be raised by utilization of the administered number of times of power-off Especially, in the first embodiment, energy saving contribution is provided in accordance with the number of times of power-off for the image forming apparatus 30, and based on the tally results of the energy saving contribution, a high priority right or a low priority right with regard to the rank order of execution of jobs is provided to each of the users. Accordingly, the conscious mind of the users for energy saving in the image forming apparatus 30 can be raised more. As a result, users tend to avoid the useless power-on of the image forming apparatus 30 in order to acquire a high priority right, whereby energy saving of the image forming apparatus 30 can be attained efficiently.

2. Second Embodiment

The second embodiment is different from the first embodiment in a point that a usable capacity of memory is increased or decreased for a user provided with a high priority right or a low priority right. Since the structures of the information processing apparatus 10, the server 20, and the image forming apparatus 30 other than the above are the same as those in the above-mentioned first embodiment, the same reference numbers are given to the common structural components and the detailed description for them are omitted.

[Structural Examples of Memories]

FIG. 21 shows an example of the structure of the RAM 206 of the server 20. As shown in FIG. 21, the RAM 206 includes an exclusive memory 206a assigned to the user A, an exclusive memory 206b assigned to the user B, an exclusive memory 206c assigned to the user C, an exclusive memory 206d assigned to the user D, and an operational memory 206e.

The operational memory 206e is a memory region given as an advantage to a user provided with a high priority right, and if a user is provided with a high priority right, the exclusive right of the operational memory 206e is given to the user. Thereby, only the user is made to be able to use the operational memory 206e. The exclusive right is set to "no eligible user" at the initial stage. In this example, the capacity of each of the exclusive memories 206a, 206b, 206c, and 206d is Y (MB), and the capacity of the operational memory 206e is (Y×10%)/100% (MB), and the total capacity is X (MB). In this connection, the above-mentioned exclusive memory 206a, the operational memory 206e, and the like may be constituted by memories other than the RAM 206.

[Operational Examples of the Server at the Time of Provision of a High Priority Right to a User]

FIG. 22 is a flowchart which shows an example of operations of the server 20 at the time of provision of a high priority right to a user. As shown in FIG. 22, at Step S130, the CPU 202 judges whether any one of the users is provided with a high priority right. Whether a high priority right is given, can be judged by, for example, whether any one of the users is registered in a high priority right registering person of the memory section 210. When the CPU 202 judges that any one of the users is provided with a high priority right, the processing proceeds to Step S132, and when the CPU 202 judges that none of the users is provided with a high priority right, the processing proceeds to Step S134.

Figure 23:
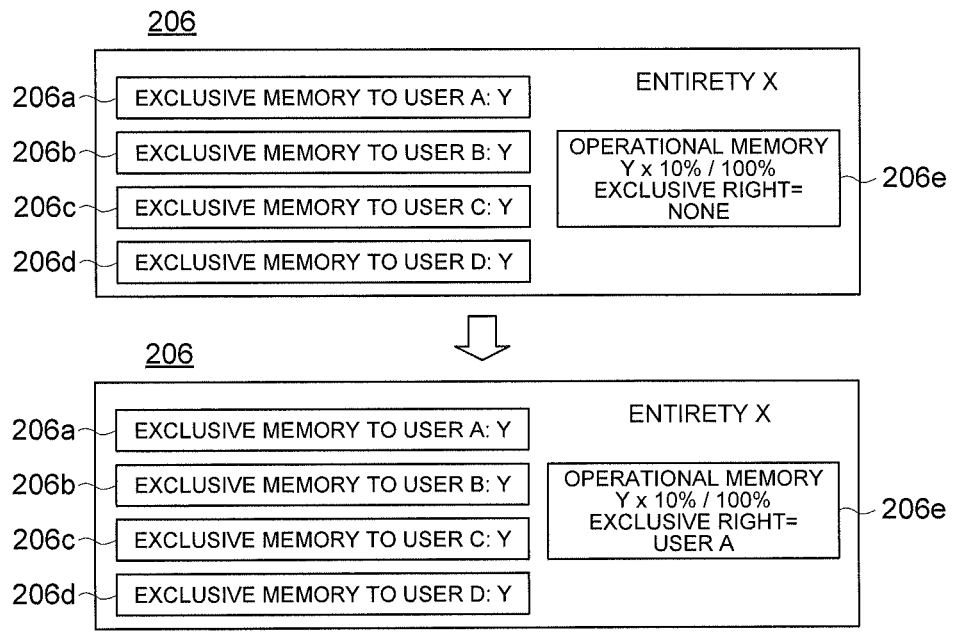
FIG. 23 is a schematic diagram for explaining an operational example of the server in the case where the exclusive right of an operational memory of the memory section is changed.

At step S132, the CPU 202 gives the exclusive right of the operational memory 206e to the user provided with the high priority right. FIG. 23 shows the operational examples in the case where the exclusive right of the operational memory 206e is given to the user provided with the high priority right. As shown in FIG. 23, in the condition before provision of a high priority right, the exclusive right of the operational memory 206e is given to none of the users. In contrast to this, if a high priority right is given to the user A, for example, the CPU 202 gives the exclusive right of the operational memory 206e to the user A. Thereby, the capacity of exclusive memory 206a of the user A is increased by (Y×10%)/100% (MB) as compared with the conventional capacity of Y (MB), and becomes, in total, Y+((Y×10%)/100%) (MB).

When a high priority right is given to non of the users, at Step S134, the exclusive right of the operational memory 206e is made "no eligible user", and each of the users has a usable capacity of memories as usual.

[Operational Examples of the Server at the Time of Provision of a Low Priority Right to a User]

Figure 24:
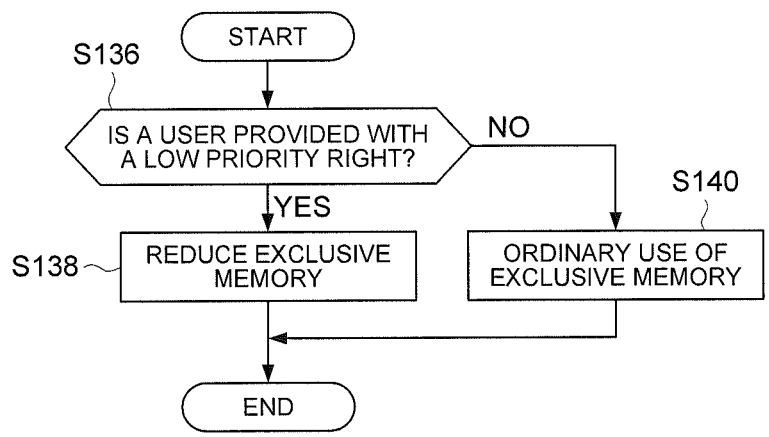
FIG. 24 is a flowchart showing an operational example of the server in the case where a low priority right is provided.

FIG. 24 is a flowchart which shows an example of operations of the server 20 at the time of provision of a low priority right to a user. As shown in FIG. 24, at Step S136, the CPU 202 judges whether any one of the users is provided with a low priority right. Whether a low priority right is given, can be judged by, for example, whether any one of the users is registered in a low priority right registering person of the memory section 210. When the CPU 202 judges that any one of the users is provided with a low priority right, the processing proceeds to Step S138, and when the CPU 202 judges that none of the users is provided with a low priority right, the processing proceeds to Step S140.

Figure 25:
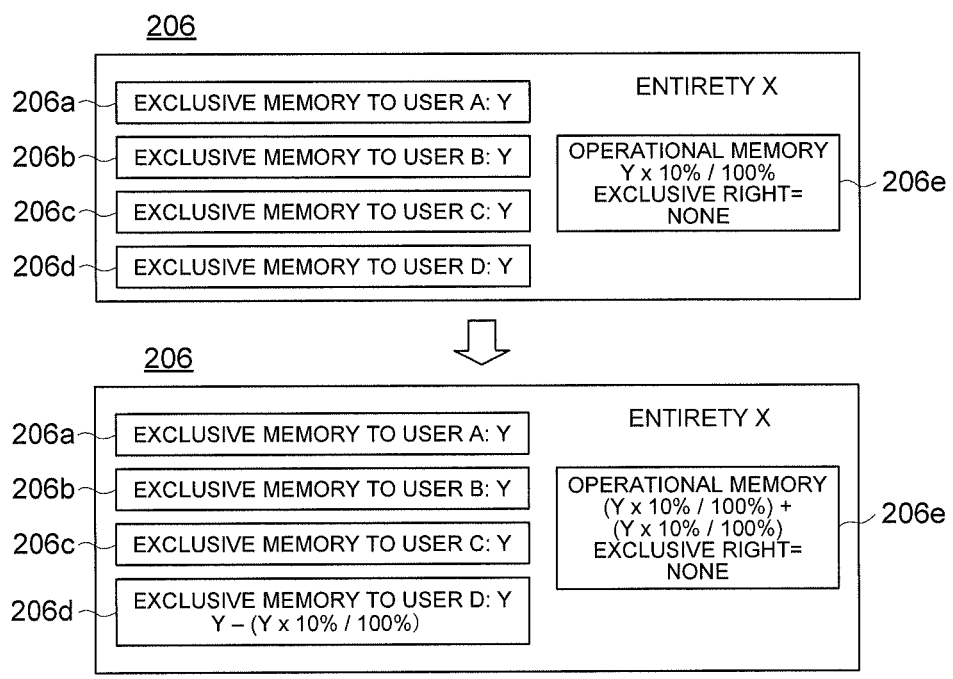
FIG. 25 is a schematic diagram for explaining an operational example of the server in the case where the usable capacity of the exclusive memory of the memory section is changed.

At step S138, the CPU 202 reduces the capacity of the exclusive memory assigned to the user provided with the low priority right. FIG. 25 shows the operational examples in the case where the usable capacity of the exclusive memory 206d of the user D provided with a low priority right is reduced. As shown in FIG. 25, in the condition before provision of a low priority right, the exclusive memories 206a to 206d with an equal capacity are assigned respectively to the users A to D. In contrast to this, if a low priority right is given to the user A, for example, the memory capacity of the exclusive memory 206d assigned at the beginning to the user D is reduced by a predetermined capacity. For example, the memory capacity of exclusive memory 206d of the user d is reduced by (Y×10%)/100% (MB) as compared with the initial capacity of Y (MB), and becomes, in total, Y−((Y×10%)/100%) (MB).

When a low priority right is given to none of the users, at Step S140, the memory capacity of the exclusive memory of each of the users is not reduced, and each of the users can be used the exclusive memory as usual.

As explained above, according to the second embodiment, since the number of times of power-off of the image forming apparatus 30 is administered as with the first embodiment, conscious mind of users for energy saving for an image forming apparatus can be raised by utilization of the administered number of times of power-off of the image forming apparatus 30. Especially, in the second embodiment, energy saving contribution is provided in accordance with the number of times of power-off for the image forming apparatus 30, and based on the tally results of the energy saving contribution, a high priority right or a low priority right with regard to the usable capacity of memories is provided to each of the users. Accordingly, the conscious mind of the users for energy saving in the image forming apparatus 30 can be raised more. As a result, users tend to avoid the useless power-on of the image forming apparatus 30 in order to acquire a high priority right, whereby energy saving of the image forming apparatus 30 can be attained efficiently.

As with the first embodiment or the second embodiment, the provision of a high priority right or a low priority right to a user is not essential, and it may be enough if at least the number of power-off of the image forming apparatus 30 is administered. The use of the number of power-off may raise the conscious mind of the users for energy saving for the image forming apparatus. For example, it may be enough only if the point spreadsheet 218 is indicated on the operation display section 310 of the image forming apparatus 30, or the display section 110 of each of the information processing apparatuses 10. In the organizations of companies or associations, the establishment of criteria for every user and every group based on this point spreadsheet 218 makes it possible to activate energy saving of the image forming apparatus 30.

Incidentally, the technical scope of the present invention is not limited to the above-mentioned embodiments, and the technical scope includes various modifications added to the above-mentioned embodiments within a range that the modifications do not deviate from the intent of the present invention. For example, in the above-mentioned first and second embodiments, the server 20 and the image forming apparatus 30 are structured independently from each other. However, the function of the server 20 may be made to be mounted in the image forming apparatus 30. In this case, the administration of the number of power-off operations and the provision of a high priority right and a low priority right may be conducted by the control section 300 of the image forming apparatus 30, or another exclusive control section may be provided separately.

Further, the information processing apparatus 10 used for the users are fixed beforehand. However, the present invention should not be limited to this. For example, the users may use any one of the information processing apparatuses 10. Even in this case, since the number of times of power-off operations is administered based on respective user IDs owned by the users, a high priority right and a low priority right can be surely given to every user who operate to turn off the power source.

Furthermore, in the above-mentioned first and second embodiments, a high priority right and a low priority right are given to respective users. However, the present invention should not be limited to this. For example, a high priority right and a low priority right may be given to the information processing apparatuses 10 which are used by the users. Moreover, a total point is calculated for each of groups to which users belong respectively, and a high priority right and a low priority right may be given for every group based on this total point. In addition, a high priority right and a low priority right in the first embodiment and a high priority right and a low priority right in the second embodiment may be combined.

Still furthermore, in the above-mentioned first embodiment, explanation is given to the case where the main power supply of the image forming apparatus 30 is turned off However, the present invention may be applied to the case where the image forming apparatus 30 is on the condition of an energy saving mode. For example, when a user switches a current mode to an energy saving mode, the switching of the user is deemed to correspond to the pattern "user which operates to turn off the power source of the image forming apparatus 30" shown in FIG. 5, and an energy saving contribution may be given the user who conducts switching.

What is claimed is:

1. A data administering apparatus configured to be connected to a plurality of information processing apparatuses and to administer information which is transmitted from the plurality of information processing apparatuses and relates to an image forming apparatus, comprising:
   a communicating section to receive power-off information which is transmitted from the plurality of information processing apparatuses and is used to turn off a power source of the image forming apparatus, and
   a control section to administer a number of times of power-off of the image forming apparatus based on the power-off information received by the communicating section,
   wherein the control section provides a degree of contribution for energy saving in the image forming apparatus based on the number of times of power-off to each of the plurality of information processing apparatuses or each of a plurality of users who use respectively the plurality of information processing apparatuses.

2. The data administering apparatus described in claim 1, wherein the control section provides a high priority right at a time of use of the image forming apparatus based on the degree of contribution to one of the plurality of information processing apparatuses or one of the plurality of users.

3. The data administering apparatus described in claim 2, wherein when a plurality of jobs are waiting for processing, the control section moves up the processing rank order of a job of an information processing apparatus or a user each provided with the high priority right than the processing rank order of the other jobs.

4. The data administering apparatus described in claim 2, further comprising: a memory section including a plurality of exclusive memories which are assigned respectively to the plurality of information processing apparatuses or to the plurality of users,
   wherein the control section increases a usable capacity of the exclusive memory of an information processing apparatus or a user each provided with the high priority right.

5. The data administering apparatus described in claim 1, wherein the control section provides a low priority right at a time of use of the image forming apparatus based on the degree of contribution to one of the plurality of information processing apparatuses or one of the plurality of users.

6. The data administering apparatus described in claim 5, wherein when a plurality of jobs are waiting for processing, the control section moves down the processing rank order of a job of an information processing apparatus or a user each provided with the low priority right than the processing rank order of the other jobs.

7. The data administering apparatus described in claim 5, further comprising:
   a memory section including a plurality of exclusive memories which are assigned respectively to the plurality of information processing apparatuses or to the plurality of users,
   wherein the control section decreases a usable capacity of the exclusive memory of an information processing apparatus or a user each provided with the low priority right.

8. The data administering apparatus described in claim 1, wherein the communicating section receives from the information processing apparatus first identification information indicating a user who uses the information processing apparatus which has transmitted the power-off information, and the control section administrates the number of times of power-off for each of the plurality of users based on the first identification information and the power-off information both received by the communicating section.

9. The data administering apparatus described in claim 1, wherein the communicating section receives second identification information indicating the information processing apparatus which has transmitted the power-off information, and the control section administrates the number of times of power-off for each of the plurality of information processing apparatuses based on the second identification information and the power-off information both received by the communicating section.

10. A data administering apparatus configured to be connected to a plurality of information processing apparatuses and to administer information which is transmitted from the plurality of information processing apparatuses and relates to an image forming apparatus, comprising:
    a communicating section to receive power-off information which is transmitted from the plurality of information processing apparatuses and is used to turn off a power source of the image forming apparatus, and
    a control section to administer a number of times of power-off of the image forming apparatus based on the power-off information received by the communicating section,
    wherein the control section sets up an upper limit of the number of times at a time of count of the number of times of power-off, and when the number of times of power-off becomes the upper limit of the number of times or more, the control section does not count the number of times of power-off.

11. A data administering apparatus configured to be connected to a plurality of information processing apparatuses and to administer information which is transmitted from the plurality of information processing apparatuses and relates to an image forming apparatus, comprising:
    a communicating section to receive power-off information which is transmitted from the plurality of information processing apparatuses and is used to turn off a power source of the image forming apparatus, and
    a control section to administer a number of times of power-off of the image forming apparatus based on the power-off information received by the communicating section,
    wherein when the power-off information is transmitted consecutively from the same information processing apparatus or the same user, the control section does not count the power-off information transmitted consecutively;
    wherein the control section sets up an upper limit of the number of times at a time of count of the number of times of power-off, and when the number of times of power-off becomes the upper limit of the number of times or more, the control section does not count the number of times of power-off.

12. An image forming system, comprising,
    a plurality of information processing apparatuses;
    a data administering apparatus; and
    an image forming apparatus; wherein the plurality of information processing apparatuses, the data administering apparatus, and the image forming apparatus are connected to each other via a network, each of the plurality of information processing apparatuses includes a communicating section to transmit power-off information to turn off a power source of the image forming apparatus, and one of the data administering apparatus and the image forming apparatus includes a communicating section to receive the power-off information transmitted from the plurality of information processing apparatuses and a control section to administer a number of times of power-off of the image forming apparatus based on the power-off information received by the communicating section, wherein the control section provides a degree of contribution for energy saving in the image forming apparatus based on the number of times of power-off to each of the plurality of information processing apparatuses or each of a plurality of users who use respectively the plurality of information processing apparatuses.

13. The image forming system described in claim 12, wherein each of the plurality of information processing apparatuses includes a display section to indicate a tally result of the number of times of power-off of the image forming apparatus administered by the data administering apparatus.

14. A data administering method in an image forming system in which a plurality of information processing apparatuses, a data administering apparatus, and an image forming apparatus are connected to each other via a network, comprising, a transmitting step, by each of the plurality of information processing apparatuses, for transmitting power-off information to turn off a power source of the image forming apparatus;

a receiving step, by one of the data administering apparatus and the image forming apparatus, for receiving the power-off information transmitted from the plurality of information processing apparatuses; and a control step, by one of the data administering apparatus and the image forming apparatus, for administering a number of times of power-off of the image forming apparatus based on the power-off information received by the receiving step, wherein the control step provides a degree of contribution for energy saving in the image forming apparatus based on the number of times of power-off to each of the plurality of information processing apparatuses or each of a plurality of users who use respectively the plurality of information processing apparatuses.

15. A non-transitory recording medium storing a data administering program for use in a data administering apparatus which is connected to a plurality of information processing apparatuses and an image forming apparatus via a network, comprising;

a receiving step for receiving power-off information transmitted from the plurality of information processing apparatuses; and a control step for administering a number of times of power-off of the image forming apparatus based on the power-off information received by the receiving step, wherein the control step provides a degree of contribution for energy saving in the image forming apparatus based on the number of times of power-off to each of the plurality of information processing apparatuses or each of a plurality of users who use respectively the plurality of information processing apparatuses.

* * * * *